United States Patent
Sen et al.

(10) Patent No.: US 12,506,426 B2
(45) Date of Patent: Dec. 23, 2025

(54) SWITCHING MODULE OF A POWER ELECTRONIC SWITCHING ASSEMBLY AND A PROCESS OF COMMUTATING THE SAME

(71) Applicant: GE ENERGY POWER CONVERSION TECHNOLOGY LIMITED, Warwicksire (GB)

(72) Inventors: Bhaskar Sen, Rugby (GB); Allan Crane, Rugby (GB); Ushindibaba Mupambireyi, Rugby (GB); Andrew Goldney, Rugby (GB)

(73) Assignee: GE ENERGY POWER CONVERSION TECHNOLOGY LIMITED, Warwicksire (GB)

( * ) Notice: Subject to any disclaimer, the term of this patent is extended or adjusted under 35 U.S.C. 154(b) by 160 days.

(21) Appl. No.: 18/411,612

(22) Filed: Jan. 12, 2024

(65) Prior Publication Data

US 2024/0313675 A1    Sep. 19, 2024

(30) Foreign Application Priority Data

Feb. 9, 2023 (EP) .................................. 23155859

(51) Int. Cl.
*H02M 1/32* (2007.01)
*H02K 3/28* (2006.01)
(Continued)

(52) U.S. Cl.
CPC ................. *H02P 6/14* (2013.01); *H02K 3/28* (2013.01); *H02K 11/33* (2016.01)

(58) Field of Classification Search
CPC ...... H02P 6/14; H02P 6/15; H02P 6/20; H02P 7/04; H02K 3/28; H02K 11/33;
(Continued)

(56) References Cited

U.S. PATENT DOCUMENTS 4,580,205 A    4/1986  Matsuse
4,707,777 A   11/1987  Cho
(Continued)

FOREIGN PATENT DOCUMENTS

DE    4447406 C1    6/1996
EP    0669053 A1    8/1995
(Continued)

OTHER PUBLICATIONS

European Search Report for EP Application No. 23155859.4 dated Jul. 28, 2023, 5 pages.

*Primary Examiner* — Muhammad S Islam
(74) *Attorney, Agent, or Firm* — Wood IP Law, LLC; Theodore A. Wood

(57) ABSTRACT

Provided is a switching module and a process of commutating the switching module. The switching module includes an H-bridge circuit with bidirectional switches and an active clamp with switches that are also arranged as an H-bridge. The process of commutating the switching module includes a sequence of alternating first and second commutation events where timing signals used to control the switches during each commutation event are varied according to closed loop control of the voltage across the energy storage device of the active clamp.

15 Claims, 9 Drawing Sheets

(51) Int. Cl.
*H02K 11/33* (2016.01)
*H02P 6/14* (2016.01)

(58) Field of Classification Search
CPC ...... H02M 1/38; H02M 1/342; H02M 1/4233; H02M 7/53871
See application file for complete search history.

(56) References Cited

U.S. PATENT DOCUMENTS

| | | |
|---|---|---|
| 4,740,881 A | 4/1988 | Park et al. |
| 5,379,209 A | 1/1995 | Goff |
| 5,892,675 A | 4/1999 | Yatsu et al. |
| 9,252,645 B2 | 2/2016 | Crane |
| 10,566,909 B2 | 2/2020 | Denzer et al. |
| 10,811,942 B2 | 10/2020 | Liu et al. |
| 10,840,833 B2 | 11/2020 | Bosga et al. |
| 2006/0139823 A1* | 6/2006 | Shoji ........................ H02M 1/34 361/56 |
| 2007/0285951 A1* | 12/2007 | Bien ........................ H02M 1/38 363/16 |
| 2010/0207561 A1 | 8/2010 | Kanyo |
| 2020/0366218 A1* | 11/2020 | Frebel ............... H02M 3/33538 |

FOREIGN PATENT DOCUMENTS

| | | |
|---|---|---|
| EP | 2704297 A1 | 3/2014 |
| EP | 2975752 A1 | 1/2016 |
| JP | 3338711 B2 | 10/2002 |
| WO | 9508213 A1 | 3/1995 |

\* cited by examiner

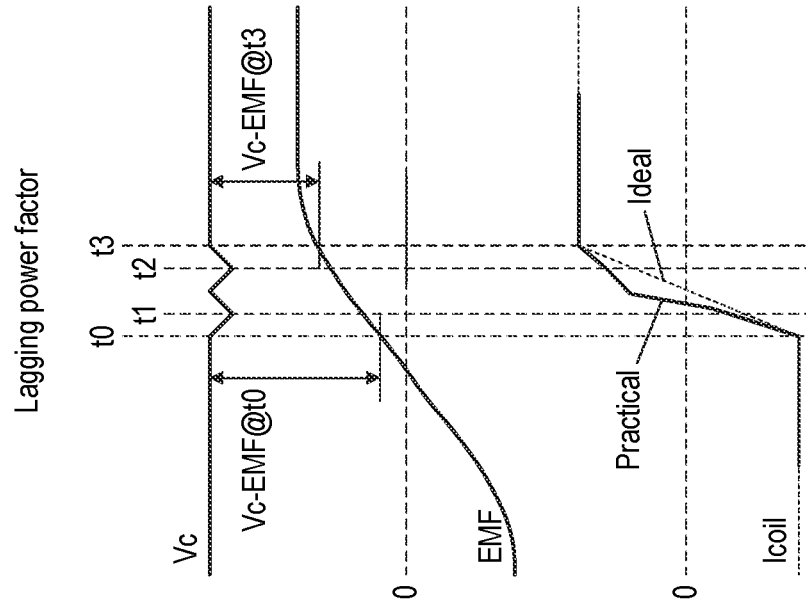
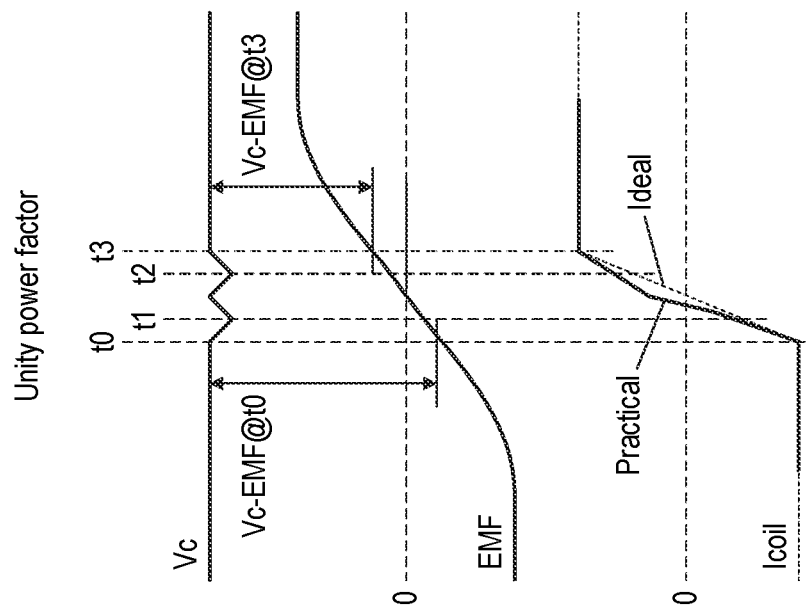
FIG. 8
FIG. 7

SWITCHING MODULE OF A POWER ELECTRONIC SWITCHING ASSEMBLY AND A PROCESS OF COMMUTATING THE SAME

CROSS-REFERENCE TO RELATED APPLICATIONS

This application claims priority to European Patent Application Serial Number EP23155859.4, filed Feb. 9, 2023, which is herein incorporated by reference.

The present invention relates to a process of commutating a switching module of a power electronic switching assembly.

The power electronic switching assembly may comprise a plurality of switching modules and may be part of a direct current (DC) electrical machine comprising a stator with a plurality of stator coils, each stator coil being electrically connected to a respective switching module.

BACKGROUND

EP 2704297 describes a current-fed electronically-commutated DC electrical machine in which the inductive energy associated with commutating the current in the stator coils is passively transferred to a voltage clamp capacitor. This energy is subsequently returned to the armature circuit by an energy recovery circuit (or ERC). The size of the commutation circuit is dominated by the size of the voltage clamp capacitor. FIG. 3 of EP 2704297 shows how the coil current may be controlled. The rate of change of coil current during current transitions is defined by the difference between the stator coil open circuit voltage and the ERC clamp voltage, in conjunction with the commutating inductance of the stator coil. A number of commutation modes are shown in FIG. 4 of EP 2704297. Each commutation involves two stages: namely a first stage where the energy associated with commutating current in the stator coil is transferred into the ERC in a single pulse, and a second stage where the stored energy is transferred back to the armature circuit.

One problem with the commutation process described in EP 2704297 is that the voltage clamping and energy recovery functions each require dedicated circuits and so the overall design is fairly complex. Another problem is that the voltage clamping, being passive in nature, requires a physically large energy storage device (e.g., a capacitor).

SUMMARY

The present invention aims to address the problems identified above and provides an active commutation and energy recovery process that can be used to provide energy-efficient commutation of a DC electrical machine, for example. The present invention provides a process of commutating a switching module of a power electronic switching assembly according to claim 1. The present invention further provides a switching module according to claim 9. Each switching module of the power electronic switching assembly comprises an H-bridge circuit and an active clamp. The commutation process according to the present invention allows the size of the energy storage device of the active clamp to be minimised.

The H-bridge circuit of each switching module comprises:
first and second AC bridge terminals electrically connectable to a respective coil, e.g., a stator coil of a DC electrical machine,
first and second DC bridge terminals electrically connectable to a DC current source,
a first switch electrically connected between the first AC bridge terminal and the first DC bridge terminal,
a second switch electrically connected between the first AC bridge terminal and the second DC bridge terminal,
a third switch electrically connected between the second AC bridge terminal and the first DC bridge terminal, and
a fourth switch electrically connected between the second AC bridge terminal and the second DC bridge terminal.

The active clamp of each switching module comprises:
a first AC clamp terminal electrically connected to the first AC bridge terminal,
a second AC clamp terminal electrically connected to the second AC bridge terminal,
first and second DC clamp terminals,
a fifth switch electrically connected between the first AC clamp terminal and the first DC clamp terminal,
a sixth switch electrically connected between the first AC clamp terminal and the second DC clamp terminal,
a seventh switch electrically connected between the second AC clamp terminal and the first DC clamp terminal,
an eighth switch electrically connected between the second AC clamp terminal and the second DC clamp terminal, and
an energy storage device (e.g., a capacitor) electrically connected between the first and second DC terminals.

In each H-bridge circuit, the first and second switches are electrically connected in series between the first and second DC bridge terminals as a first bridge leg. The third and fourth switches are electrically connected in series between the first and second DC bridge terminals as a second bridge leg. The DC terminals of the first bridge leg and the second bridge leg are electrically connected in parallel. The connecting point between the first and second switches defines the first AC bridge terminal and the connecting point between the third and fourth switches defines the second AC bridge terminal. The second and third switches may be described as a first diagonal pair of bridge switches and the first and fourth switches may be described as a second diagonal pair of bridge switches, or vice versa.

In each active clamp, the fifth and sixth switches are electrically connected in series between the first and second DC clamp terminals as a first clamp leg. The seventh and eighth switches are electrically connected in series between the first and second DC clamp terminals as a second clamp leg. The first clamp leg and the second clamp leg are electrically connected in parallel. The connecting point between the fifth and sixth switches defines the first AC clamp terminal and the connecting point between the seventh and eighth switches defines the second AC clamp terminal. The fifth and eighth switches may be described as a first diagonal pair of clamp switches and the sixth and seventh switches may be described as a second diagonal pair of clamp switches, or vice versa. The energy storage device is electrically connected between the first and second DC clamp terminals in parallel with the first and second clamp legs.

Each switch in each H-bridge circuit and each active clamp may include one or more controllable semiconductor switches. Any suitable controllable semiconductor switches or combination of switches may be used, e.g., metal-oxide-semiconductor field-effect transistors (MOSFETs), vertical junction field-effect transistors (VJFETs), insulated-gate bipolar transistors (IGBTs), and gate-commutated thyristors. A separate diode may optionally be electrically connected in anti-parallel with each semiconductor switch, or an anti-parallel diode may be an inherent feature of the semiconductor switch itself, e.g., the body diode of the MOSFET structure. Each controllable semiconductor switch is normally turned on and off by gate drive signals generated by a gate drive controller.

In each H-bridge circuit, each switch may be a bidirectional switch, i.e., each switch may provide gate-controlled bidirectional voltage blocking capability with unidirectional current. Each bidirectional switch may consist of: (a) a pair of controllable semiconductor switches, or (b) a controllable semiconductor switch and a diode, where the pair of semiconductor devices are electrically connected in anti-series (or back-to-back)—i.e., so one of the pair of semiconductor devices blocks voltage in a first direction and the other semiconductor device blocks voltage in a second direction, opposite to the first direction. (As used herein, the term "semiconductor device" may refer to a semiconductor switch or a diode as appropriate.) When current is flowing through one of the semiconductor switches in a particular direction, it may flow through an anti-parallel diode of the other anti-series connected semiconductor switch. In the case where each semiconductor switch is a MOSFET, for example, the body diode will inherently act as an anti-parallel diode. In the case where the pair of semiconductor switches are MOSFETs, they may be electrically connected in anti-series in either a common source or a common drain arrangement, but the common source arrangement is often preferred in order to simplify the gating arrangement. This is because both MOSFETs are preferably set to the on-state simultaneously in order to benefit from simultaneous conduction of the body diode and reverse conduction in the MOSFET that provides the reverse voltage blocking function. In the case where the pair of semiconductor switches are VJFETs, there are no body diodes or anti-parallel diodes, so reverse conduction in the VJFET that provides the reverse voltage blocking function is essential when the pair of VJFETs are required to carry current. The pair of VJFETs may be electrically connected together in anti-series in either a common source of a common drain arrangement, but the common source arrangement is often preferred in order to simplify the gating arrangement. In the case of other alternative semiconductor switches, the reverse voltage blocking function may be provided by a reverse blocking junction and only a single gate control is required for each bidirectional switch.

A DC electrical machine may comprise a stator with a plurality of stator coils and a power electronic switching assembly that comprises a plurality of switching modules. The first and second AC bridge terminals of each switching module are electrically connected to a respective one of the plurality of stator coils. The stator coils may be received in slots formed in the stator. The stator coils may be of any suitable type (e.g., single-layer, two-layer etc.) and may be arranged around the stator to have any suitable winding topology. The DC electrical machine may also comprise a rotor that rotates relative to the stationary stator and which is radially spaced apart from the stator by an airgap.

A power electronic switching assembly may comprise a plurality of switching modules. Each switching module is commutated according to the process described below, but the respective commutation processes are interleaved. The stator coils of the DC electrical machine may be arranged around the stator in order to provide a plurality of phase-shifted coil voltages—typically having six or more phases. For example, a DC electrical machine having six phases might include at least a first group of six stator coils whose EMFs are phase-displaced from one another by 60°, where one cycle of stator fundamental frequency occupies 360° and where each EMF experiences two zero crossings per cycle. A DC electrical machine according to the present invention may have any convenient number of stator coils and may therefore have a larger number of phases with smaller phase-displacements between EMFs than the exemplary six phase machine. In practice, the DC electrical machine may have between five and one hundred and twenty (120) phases, for example. The number of commutation events per cycle of stator fundamental frequency is therefore equal to twice the number of phases, hence successive commutations become interleaved. In the case of a DC electrical machine having many phases, several overlapping commutation events may be in progress at any given time.

The process of commutating each switching module comprises a sequence of alternating first and second commutation events. Put another way, during operation of the DC electrical machine that includes the power electronic switching assembly, each stator coil is commutated by the respective switching module by sequentially applying a first commutation event, a second commutation event, a first commutation event, a second commutation event, and so on, and where the timing parameters of each commutation event—as described in more detail below—are varied or adjusted in order to provide closed loop control of the voltage across the energy storage device of the active clamp.

Immediately before the start of each first commutation event, the second and third switches (i.e., the first diagonal pair of bridge switches) are on and all other switches are off. The coil current is stable and is flowing through the respective coil in a first direction. Immediately before the start of each second commutation event, the first and fourth switches (i.e., the second diagonal pair of bridge switches) are on and all other switches are off. The coil current is stable and is flowing through the respective coil in a second direction, opposite to the first direction.

For each first commutation event:
at a start time that defines the start of the respective first commutation event, the fifth and eighth switches (i.e., the first diagonal pair of clamp switches) are turned on to electrically connect the energy storage device in parallel with the first and second AC bridge terminals, and remain on or substantially on until turned off at an end time that defines the end of the respective first commutation event,
at a first intermediate time at or after the start time and before the end time, the first switch is turned on to provide a bypass path through the first and second switches (i.e., through the first bridge leg) and immediately afterwards the third switch is turned off, and
at a second intermediate time after the start time and at or before the end time, and after the first intermediate time, the fourth switch is turned on and immediately afterwards the second switch is turned off.

Immediately after each first commutation event, the first and fourth switches (i.e., the second diagonal pair of bridge switches) are on and all other switches are off. The first and fourth switches remain on until the start of the subsequent second commutation event. The coil current is stable and is flowing through the respective coil in the second direction, i.e., the current flow direction has been reversed or commutated by the switching module. In this context, the term "[remain . . . ] substantially on" means that the first diagonal pair of clamp switches may optionally be turned off momentarily—e.g., for less than about 500 ns—one or more times during each first commutation event for dead time mitigation. (For the avoidance of any doubt, momentarily turning off the first diagonal pair of clamp switches means turning the switches off, and then turning the switches back on again a short time later—e.g., after less than about 500 ns. In practice, the switches may be turned off for about 50 to about 100 ns.) This dead time mitigation is described in more detail below. Where dead time mitigation is not required, the first diagonal pair of clamp switches will typically remain on for the entire duration of each first commutation event.

For each second commutation event:
at a start time that defines the start of the respective second commutation event, the sixth and seventh switches (i.e., the second diagonal pair of clamp switches) are turned on to electrically connect the energy storage device in parallel with the first and second AC bridge terminals, and remain on or substantially on until turned off at an end time that defines the end of the respective second commutation event,
at a first intermediate time at or after the start time and before the end time, the third switch is turned on to provide a bypass path through the third and fourth switches (i.e., through the second bridge leg) and immediately afterwards the first switch is turned off, and
at a second intermediate time after the start time and at or before the end time, and after the first intermediate time, the second switch is turned on and immediately afterwards the fourth switch is turned off.

Immediately after each second commutation event, the second and third switches (i.e., the first diagonal pair of bridge switches) are on and all other switches are off. The second and third switches remain on until the start of the subsequent first commutation event. The coil current is stable and is flowing through the respective coil in the first direction, i.e., the current flow direction has been reversed or commutated by the switching module. In this context, the term "[remain . . . ] substantially on" means that the second diagonal pair of clamp switches may optionally be turned off momentarily—e.g., for less than about 500 ns—one or more times during each second commutation event for dead time mitigation. (For the avoidance of any doubt, momentarily turning off the second diagonal pair of clamp switches means turning the switches off, and then turning the switches back on again a short time later—e.g., after less than about 500 ns. In practice, the switches may be turned off for about 50 to about 100 ns.) This dead time mitigation is described in more detail below. Where dead time mitigation is not required, the second diagonal pair of clamp switches will typically remain on for the entire duration of each second commutation event.

During the commutation process, for each first and second commutation event, the time period between the start time and the first intermediate time, and the time period between the start time and the second intermediate time, are varied according to closed loop control of the voltage across the energy storage device of the active clamp. For example, the time periods may be decreased (or shortened) to increase the energy storage device voltage, or the time periods may be increased (or lengthened) to decrease the energy storage device voltage. The time periods may be varied independently.

Each switching module further comprises a controller adapted to commutate the switching module according to a commutation process comprising a sequence of alternating first and second commutation events.

For each first commutation event each controller is adapted to:
turn on the fifth and eighth switches (i.e., the first diagonal pair of clamp switches) at a start time that defines the start of the respective first commutation event, to electrically connect the energy storage device in parallel with the first and second AC bridge terminals, and to turn off the fifth and eight switches at an end time that defines the end of the respective first commutation event,
turn on the first switch at a first intermediate time at or after the start time and before the end time to provide a bypass path through the first and second switches (i.e., through the first bridge leg) and immediately afterwards to turn off the third switch, and
turn on the fourth switch at a second intermediate time after the start time and at or before the end time, and after the first intermediate time, and immediately afterwards to turn off the second switch.

Each controller may be adapted to momentarily turn off the first diagonal pair of clamp switches one or more times during each first commutation event for dead time mitigation. (For the avoidance of any doubt, momentarily turning off the first diagonal pair of clamp switches means turning the switches off, and then turning the switches back on again a short time later—e.g., after less than about 500 ns. In practice, the switches may be turned off for about 50 to about 100 ns.) This optional dead time mitigation is described in more detail below. Where dead time mitigation is not required, the first diagonal pair of clamp switches will typically remain on for the entire duration of each first commutation event.

For each second commutation event each controller is adapted to:
turn on the sixth and seventh switches (i.e., the second diagonal pair of clamp switches) at a start time that defines the start of the respective second commutation event, to electrically connect the energy storage device in parallel with the first and second AC bridge terminals, and to turn off the sixth and seventh switches at an end time that defines the end of the respective second commutation event,
turn on the third switch at a first intermediate time at or after the start time and before the end time, to provide a bypass path through the third and fourth switches (i.e., through the second bridge leg) and immediately afterwards to turn off the first switch, and
turn on the second switch at a second intermediate time after the start time and at or before the end time, and after the first intermediate time, and immediately afterwards to turn off the fourth switch.

Each controller may be adapted to momentarily turn off the second diagonal pair of clamp switches one or more times during each second commutation event for dead time mitigation. (For the avoidance of any doubt, momentarily turning off the second diagonal pair of clamp switches means turning the switches off, and then turning the switches back on again a short time later—e.g., after less than about 500 ns. In practice, the switches may be turned off for about 50 to about 100 ns.) This optional dead time mitigation is described in more detail below. Where dead time mitigation is not required, the second diagonal pair of clamp switches will typically remain on for the entire duration of each second commutation event.

For each first and second commutation event of the commutating process, each controller is further adapted to vary the time period between the start time and the first intermediate time, and the time period between the start time and the second intermediate time, according to closed loop control of the voltage across the energy storage device of the active clamp. For example, each controller may be adapted to decrease (or shorten) the time periods to increase the energy storage device voltage, or to increase (or lengthen) the time periods to decrease the energy storage device voltage. The time periods may be varied independently by each controller.

The closed loop control (e.g., as carried out by the controller of each switching module) may use a voltage reference indicative of a desired voltage across the energy storage device, and a voltage feedback, i.e., indicative of the actual magnitude of the energy storage device voltage which may be measured by a voltage sensor or otherwise derived, for example. More particularly, the difference (or "error") between the voltage reference and the voltage feedback (i.e., between the desired energy storage device voltage and the actual energy storage device voltage) may be provided to a sub-controller that applies a correction based on one or more of proportional, integral and derivative terms. The sub-controller may comprise a proportional-integral (PI) or proportional-integral-derivative (PID) controller, for example. The output of the sub-controller may be used to determine the first intermediate time, the second intermediate time, and the end time of each first and second commutation event so that the timing parameters of each commutation event are varied or adjusted to achieve a desired voltage across the energy storage device of the active clamp during the course of the commutation process. Each controller may include a closed loop controller and the sub-controller may be part of the closed loop controller, for example. Each controller may also use one or more of a DC current feedback indicative of the actual magnitude of DC current, a coil current feedback indicative of the actual magnitude of coil current, and a coil voltage feedback indicative of the actual magnitude of coil voltage to determine the first intermediate time, the second intermediate time, and the end time. The coil voltage feedback and coil current feedback may be measured by a voltage or current sensor or otherwise derived, for example. All references and feedbacks may be provided to each controller as control signals.

Each controller may apply closed loop control by adjusting the time periods between the start time and the first and second intermediate times. For example, each controller may be adapted to generate timing signals that determine when the bridge switches of the respective switching module are turned on and off by gate control during each commutation event to control the discharging and charging of the energy storage device. The timing signals may also determine when the clamp switches are turned on and off by gate control to start and end each commutation event. The timing signals may be used by a gate drive controller to generate gate drive signals for turning the bridge switches and clamp switches on and off, for example. The gate drive controller may be part of the controller—e.g., where the controller for each switching module includes a closed loop controller. and a gate drive controller for generating gate drive signals that practically implement the closed loop voltage control by turning the bridge switches and the clamp switches on and off. The start time of each first and second commutation event may be determined by the controller based on a phase reference. The phase reference may be provided to the controller from a top-level controller for the power electronic switching assembly or DC electrical machine, for example. The top-level controller may also provide to the controller other reference and feedbacks such as the voltage reference and/or the DC current feedback mentioned above.

The voltage reference may be varied during the commutation process. For example, the voltage reference may be varied based on the rotational speed of the DC electrical machine.

In each commutation event, the first intermediate time may optionally be at the same time as the start time, or the second intermediate time may optionally be at the same time as the end time. These represent limit cases. In the former case, it means that the energy storage device is charged but not discharged during the particular commutation event, and in the latter case it means that the energy storage device is discharged but not charged during the particular commutation event. Typically, the first intermediate time will be after the start time such that the energy storage device is mainly charged but it is also discharged during the particular commutation event, and the second intermediate time will be before the end time such that the energy storage device is mainly discharged but is also charged during the particular commutation event.

The present invention further provides a DC electrical machine according to claim 15.

DETAILED DESCRIPTION OF THE DRAWINGS

FIG. 7 is a schematic diagram showing current and voltage waveforms for unity power factor;

FIG. 8 is a schematic diagram showing current and voltage waveforms for lagging power factor;

DETAILED DESCRIPTION

Figure 1:
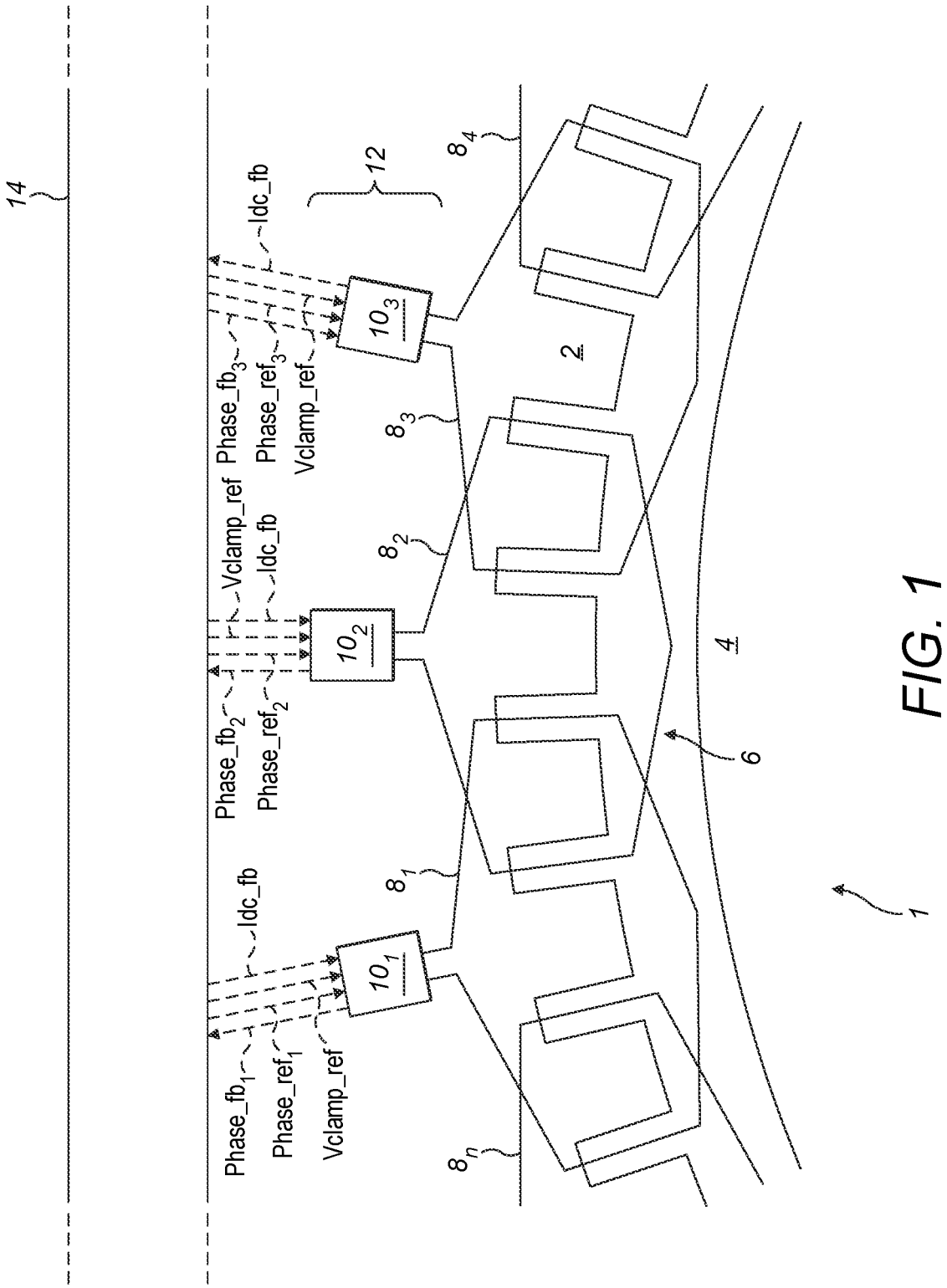
FIG. 1 is a schematic diagram showing part of a direct current (DC) electrical machine according to the present invention.

FIG. 1 shows part of a DC electrical machine 1. The DC electrical machine 1 includes a stator 2 and a rotor 4 that is spaced apart from the inner surface of the stator by an air gap 6. The stator 2 includes a plurality of stator coils $8_1$, $8_2$, ..., $8_n$, where n can be any suitable integer for the desired machine topology. The stator coils shown in FIG. 1 are single-layer coils so that one coil is received in each stator slot. The stator 2 therefore includes 2n stator slots. But it will be readily understood that the stator coils may be two-layer coils so that two coils are received in each stator slot one on top of the other, for example.

Each stator coil $8_1, 8_2, \ldots, 8_n$ is electrically connected to a respective switching module $10_1, 10_2, \ldots, 10_n$. A power electronic switching assembly 12 of the DC electrical machine 1 comprises the plurality of identical switching modules $10_1, 10_2, \ldots, 10_n$. The switching modules $10_1, 10_2, \ldots, 10_n$ are all commutated according to the commutation process described herein but the individual commutation processes are interleaved.

Figure 2:
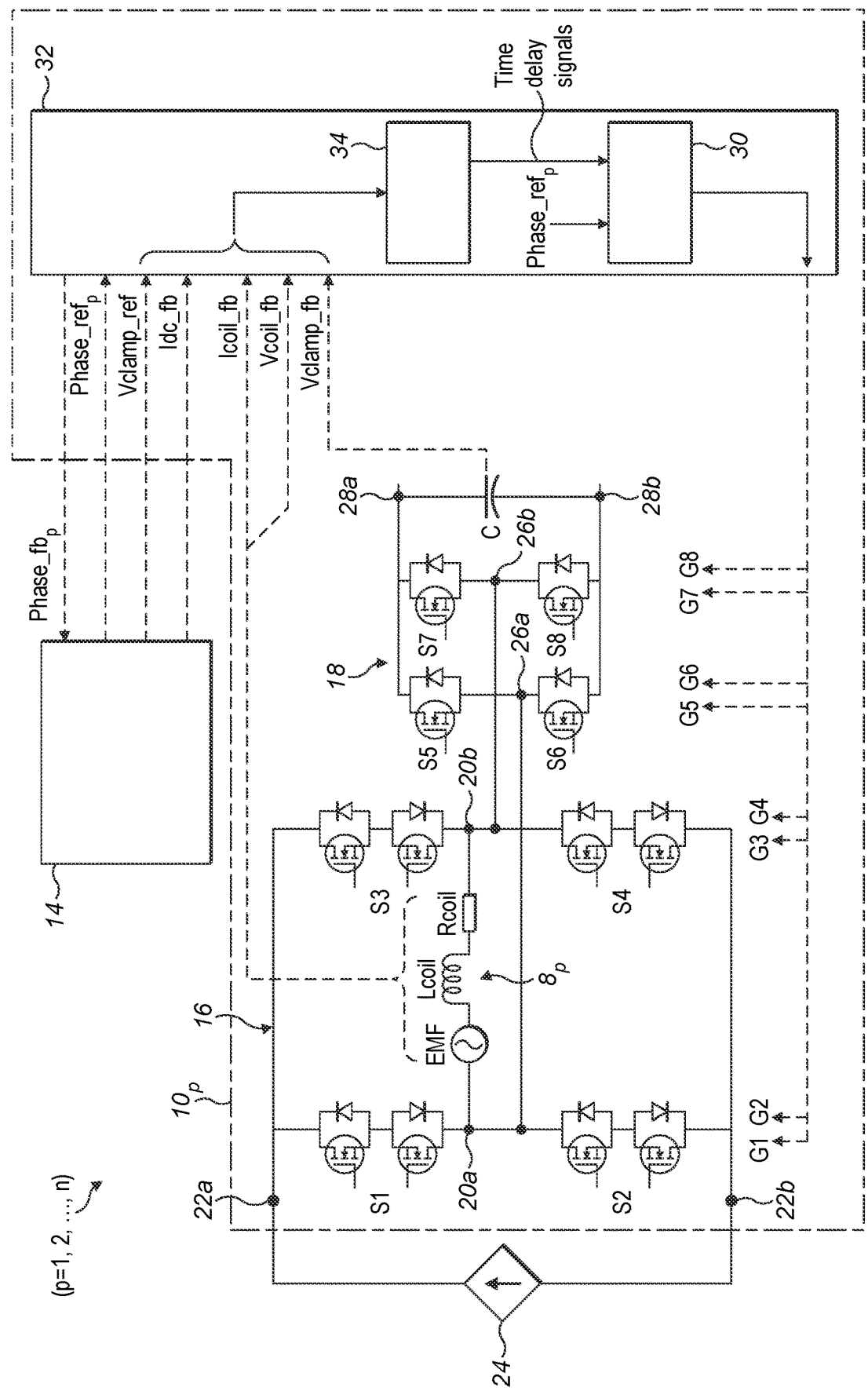
FIG. 2 is a schematic circuit diagram of a switching module and primary controller according to the present invention.

FIG. 1 also shows a primary controller 14, which may be a top-level controller for the DC electrical machine 1, for example. FIG. 2 shows a switching module $10_p$ according to the present invention in more detail (where p=1, 2, . . . , n). The switching module $10_p$ includes an H-bridge circuit 16 and an active clamp 18.

The H-bridge circuit 18 includes first and second AC bridge terminals 20a, 20b that are electrically connected to the respective stator coil $8_p$ of the DC electrical machine 1.

The stator coil $8_p$ is represented in FIG. 2 by three series-connected elements namely, the open circuit voltage of the stator coil (EMF), the commutating inductance of the stator coil (Lcoil) and the resistance of the stator coil (Rcoil).

The H-bridge circuit 16 includes first and second DC bridge terminals 22a, 22b that are electrically connected to a DC current source 24 of the DC electrical machine 1.

The H-bridge circuit 16 includes four bidirectional bridge switches S1, S2, S3 and S4. Each bridge switch S1, S2, . . . , S4 includes a pair of MOSFETs connected in anti-series (or back-to-back), but it will be understood that other possible switch arrangements are described above or are known to the skilled person. An anti-parallel diode is shown for each MOSFET within each bridge switch S1, S2, . . . , S4 and it will be understood that in practice this is provided by the body diode of each MOSFET. For each bridge switch S1, S2, . . . , S4 the reverse blocking function is provided by the lower one of the pair of anti-series connected MOSFETs and the forward blocking function is provided by the upper one of the pair of anti-series connected MOSFETs.

The bridge switches S2 and S3 define a first diagonal pair of bridge switches and the bridge switches S1 and S4 define a second diagonal pair of bridge switches.

The active clamp 18 includes first and second AC clamp terminals 26a, 26b and first and second DC clamp terminals 28a, 28b. The first AC clamp terminal 26a is electrically connected to the first AC bridge terminal 20a and the second AC clamp terminal 26b is electrically connected to the second AC bridge terminal 20b as shown.

The active clamp 18 includes four unidirectional clamp switches S5, S6, . . . , S8. Each clamp switch S5, S6, . . . , S8 includes a MOSFET, but it will be understood that other possible switch arrangements are described above or are known to the skilled person. An anti-parallel diode is shown for the MOSFET of each clamp switch S5, S6, . . . , S8 and it will be understood that in practice this is provided by the body diode of each MOSFET.

The clamp switches S5 and S8 define a first diagonal pair of clamp switches and the clamp switches S6 and S7 define a second diagonal pair of clamp switches. An energy storage device (i.e., a clamp capacitor C) is electrically connected between the first and second DC terminals 28a, 28b. The energy recovery circuit (ERC) described in EP 2704297 is therefore replaced by the active clamp 18 having an H-bridge voltage source inverter topology and where the clamp switches S5, S6, . . . , S8 can be selectively turned on and off to control the charging and discharging of the clamp capacitor C into the first and second AC terminals 20a, 20b of the H-bridge circuit 16.

The bridge switches S1, S2, . . . , S4 and the clamp switches S5, S6, . . . , S8 are controlled to turn on and off by gate drive signals G1, G2, . . . , G8 which are generated by a gate drive controller 30. When back-to-back MOSFETs or other back-to-back semiconductor switches are used, the gate drive signal for each switch is simultaneously routed to both of the semiconductor switches. For example, the gate drive signal G1 is simultaneously routed to both MOSFETs of bridge switch S1 and the gate drive signals G2, G3 and G4 are simultaneously routed to both MOSFETs of bridge switches S2, S3 and S4, respectively. This means that both MOSFETs of each bridge switch are turned on and off simultaneously by the respective gate drive signal.

The gate drive controller 30 is part of a secondary controller 32, which is a phase controller that controls an individual phase of the DC electrical machine 1. The secondary controller 32 also includes a closed loop controller 34. In a preferred arrangement, each phase has its own secondary controller 32. In another arrangement, it may be possible to combine two or more secondary controllers in a single secondary controller assembly that may be used to control a plurality of phases, but the secondary controller assembly would preferably include a separate closed loop controller 34 and gate drive controller 30 for each phase. This allows for independent closed loop control of each phase of the DC electrical machine 1.

FIG. 2 also shows the primary controller 14.

The secondary controller 32 for switching module $10_p$ receives the following control signals:
  a phase reference signal (Phase_refp),
  a clamp capacitor voltage reference signal (Vclamp_ref) indicative of a desired clamp capacitor voltage, i.e., the desired voltage across the clamp capacitor C,
  a DC current feedback signal (Idc_fb) indicative of the actual magnitude of DC current,
  a coil current feedback signal (Icoil_fb) indicative of the actual magnitude of coil current,
  a coil voltage feedback signal (Vcoil_fb) indicative of the actual magnitude of coil voltage, and
  a clamp capacitor voltage feedback signal (Vclamp_fb) indicative of the actual magnitude of the clamp capacitor voltage.

The phase reference signal (Phase_ref$_p$) is specific to the particular switching module and is provided by the primary controller 14. For example, as shown more clearly in FIG. 1, the primary controller 14 provides a first phase reference signal (Phase_ref$_1$) to the secondary controller of the first switching module $10_1$, a second phase reference signal (Phase_ref$_2$) to the secondary controller of the second switching module $10_2$, a third phase reference signal (Phase_ref$_3$) to the secondary controller of third switching module $10_3$, and so on, with an nth phase reference signal being provided to the secondary controller of the nth switching module $10_n$. The DC current feedback signal (Idc_fb) and clamp capacitor voltage reference signal (Vclamp_ref) are also provided by the primary controller 14 to the secondary controller 32 of each switching module $10_1, 10_2, \ldots, 10_n$ and are typically common to all phases or groups of phases within the DC electrical machine 1.

The reference signals provided by the primary controller 14 may define the load angle of the DC electrical machine and the rate of change of current (di/dt) during the coil current commutation. For example, the load angle of the DC electrical machine 1 is typically controlled by varying the phase shift between the coil current and the coil voltage and this may be achieved by adjusting the phase reference signal (Phase_ref$_p$) relative to the rotor position using conventional field-orientated control or the like. The adjustment of the phase reference signal (Phase_ref$_p$) for the respective switching module $10_p$ is carried out by the primary controller 14. The rate of change of current during the coil current commutation is typically controlled by varying the difference between the clamp capacitor voltage and the coil open circuit voltage (EMF) and this may be achieved by adjusting the clamp capacitor voltage reference signal (Vclamp_ref) that is provided by the primary controller 14.

The DC current feedback signal (Idc_fb) may correspond to the magnitude of the DC current source 24 or the total DC terminal current of the DC electrical machine 1, for example. DC electrical machines according to the present invention may have multiple independently controlled or parallel-connected and substantially balanced DC current sources. A DC current feedback signal representative of total DC terminal current would normally only be applicable in an arrangement where all of the DC current sources 24 are substantially balanced. In arrangements requiring redundancy it would be normal to employ a DC current feedback signal representative of the DC current source 24 that corresponds with the H-bridge circuit 16. A group of phases comprising a corresponding group of stator coils whose EMFs are phase-displaced relative to one another as described above will be electrically connected to a corresponding group of H-bridge circuits and it is preferred that the DC current source 24 that corresponds to the respective H-bridge circuits within the group of phases will have substantially equal current magnitude.

The coil current and voltage feedback signals (Icoil_fb, Vcoil_fb), and the clamp capacitor voltage feedback signal (Vclamp_fb), may be provided directly from an appropriate sensor, for example.

The secondary controller 32 of each switching module $10_1$, $10_2$, . . . , $10_n$ may provide a phase feedback signal (Phase_fbp) to the primary controller 14 that is specific to the particular switching module $10_p$. For example, as shown more clearly in FIG. 1, the secondary controller of the first switching module $10_1$ provides a first phase feedback signal (Phase_fb$_1$) to the primary controller 14, the secondary controller of the second switching module $10_2$ provide a second phase feedback signal (Phase_fb$_2$) to the primary controller, the secondary controller of the third switching module $10_3$ provides a third phase feedback signal (Phase_fb$_3$) to the primary controller, and so on, with the secondary controller of the nth switching module $10_n$ providing an nth phase feedback signal to the primary controller. Each phase feedback signal may be any convenient representation of the status of the respective switching module.

The control signals may be exchanged between the primary controller 14 and the secondary controller 32 of each switching module $10_1$, $10_2$, . . . , $10_n$ by any suitable communication means, e.g., serial communication using one or more optical fibre links.

The secondary controller 32 of each switching module $10_1$, $10_2$, . . . , $10_n$ determines timing signals based on the received control signals. The timing signals are used to derive the gate drive signals G1, G2, . . . , G8 for the bridge switches S1, S2, . . . , S4 and the clamp switches S5, S6, . . . , S8. In particular, the gate drive signals G1, G2, . . . , G8 are used to turn certain of the bridge switches S1, S2, . . . , S4 and the clamp switches S5, S6, . . . , S8 on and off at times that are determined by the timing signals, and which correspond to the start time, the first and second intermediate times, and the end time of each commutation event. The gate drive signals G1, G2, . . . , G8 may be communicated to the bridge switches S1, S2, . . . , S4 and the clamp switches S5, S6, . . . , S8 by any suitable means.

Figure 3:
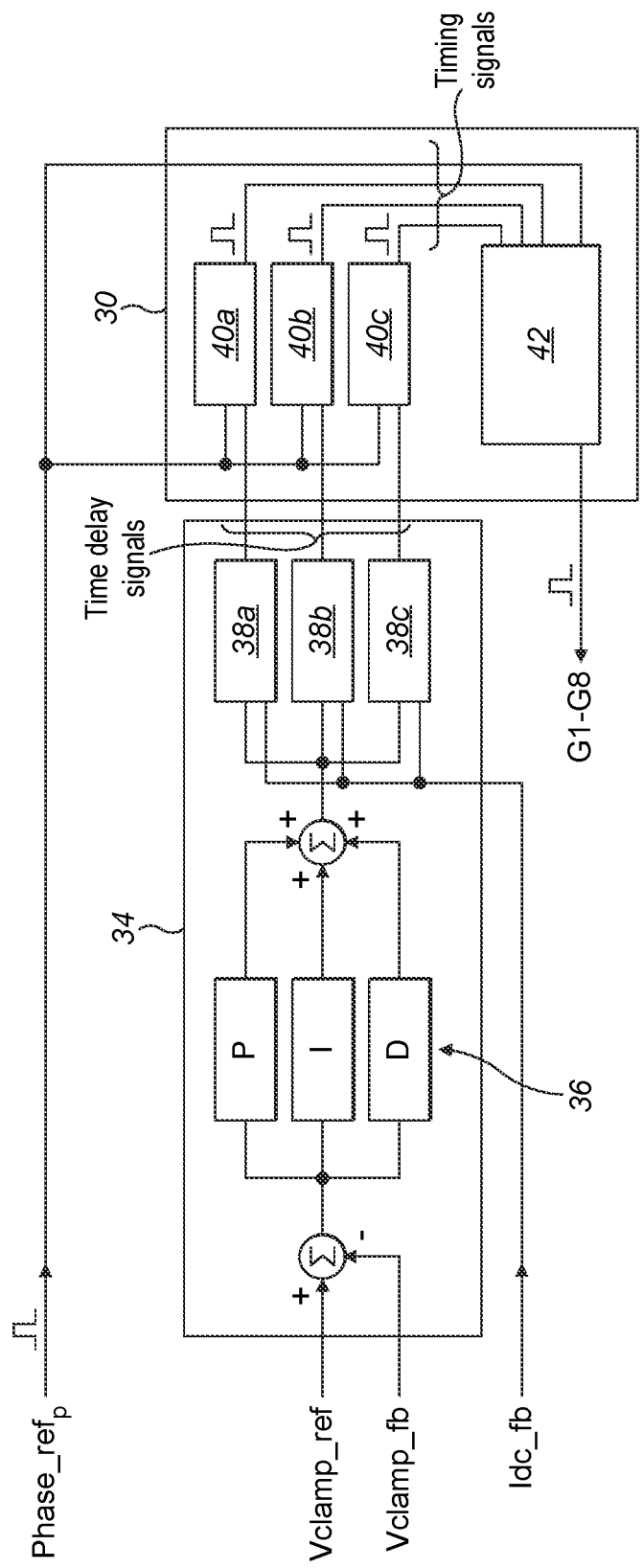
FIG. 3 is a schematic diagram showing a closed loop controller and gate drive controller that form part of a secondary controller.

The closed loop controller 34 provides closed loop control of the clamp capacitor voltage and is responsive mainly to the clamp capacitor voltage reference and feedback signals. As shown in FIG. 3, the closed loop controller 34 may include a PID sub-controller 36 that receives an error signal that is the difference (or "error") between the clamp capacitor voltage reference and feedback signals (Vclamp_ref and Vclamp_fb). In practice, any suitable type of closed loop controller or regulator may be used, including digital implementations. The closed loop controller 34 may also be responsive to one or more of the other control signals such as the DC current feedback signal (Idc_fb) and the coil current and voltage feedback signals. In the closed loop controller 34 shown in FIG. 3, the PID sub-controller 36 provides an output that is provided to three function blocks, 38$a$, 38$b$ and 38$c$. These function blocks 38$a$, 38$b$ and 38$c$ transform the output of the PID sub-controller 36 into respective time delay references. The function blocks 38$a$, 38$b$ and 38$c$ optionally benefit from the DC current feedback signal (Idc_fb) because the time period between the start time and the end time—i.e., the duration of each commutation event—is a function of the DC current.

The gate drive controller 30 includes three time delay blocks 40$a$, 40$b$ and 40$c$ that convert the time delay references into the timing signals. The pulsed outputs of the time delay blocks 40$a$, 40$b$ and 40$c$ are synchronised with the phase reference signal (Phase_ref$_p$), which is also pulsed and has a phase position that is specific to the phase number of the particular switching module $10_p$. More particularly, a first timing signal that determines the start time corresponds to the phase reference signal. The time delay block 40$a$ derives a second timing signal that determines the first intermediate time, and it will be understood that adjusting the first timing signal will increase or decrease (or lengthen or shorten) the time period between the start time and the first intermediate time. The time delay block 40$b$ derives a third timing signal that determines the second intermediate time, and it will be understood that adjusting the second timing signal will increase or decrease (or lengthen or shorten) the time period between the start time and the second intermediate time. The time delay block 40$c$ derives a fourth timing signal that determines the end time, and it will be understood that adjusting the third timing signal will increase or decrease (or lengthen or shorten) the time period between the start time and the end time—i.e., the duration of the commutation event.

The gate drive controller 30 includes a firing sequence block 42 that converts the four pulsed timing signals into eight pulsed outputs that correspond to the gate drive signals G1, G2, . . . , G8 for the bridge switches S1, S2, . . . , S4 and the clamp switches S5, S6, . . . , S8. The firing sequence block 42 also inserts dead times that ensure that certain switches are turned off immediately after another switch has been turned on after making allowances for tolerances in the turn on and turn off switching response times of individual bridge switches—for example, so that during the first commutation event, the bridge switch S3 is turned off immediately after the bridge switch S1 is turned on at the first intermediate time. The dead times are very short, typically less than about 1 μs, do not require closed loop control, and avoid any damaging interruption of DC current through the H-bridge circuit 16. Under ideal conditions only two bridge switches would be simultaneously in the on-state. But if dead time is too long, three bridge switches may be simultaneously in the on-state. For example, during each first commutation event, the bridge switch S3 is turned off immediately after bridge switch S1 is turned on, whereas in practice, dead time may be excessive thereby causing bridge switch S3 to remain on momentarily—e.g., for less than about 500 ns—after bridge switch S1 is turned on. This means that three bridge switches S1, S2 and S3 may simultaneously conduct and short out the first and second AC terminals 20a, 20b of the H-bridge circuit 16 for less than about 500 ns, for example. If momentary simultaneous conduction of three bridge switches is unavoidable, dead time mitigation may optionally be provided during each first and second commutation event by adapting the firing sequence of the clamp switches S5, S6, . . . , S8 as described below. This adapting of the firing sequence can be carried out by the firing sequence block 42.

As explained above, the timing signals include a timing signal indicative of a start time of each commutation event that is effectively a pulsed replication of the phase reference signal, and three adjustable time-delayed signals indicative of the first intermediate time, the second intermediate time, and the end time of each commutation event. The time period between the start time and the first intermediate time, and the time period between the start time and the second intermediate time, determine the timing of transitions between discharging and charging of the clamp capacitor C, thereby controlling the clamp capacitor voltage and the commutation rate. The time period between the start time and the end time corresponds to the duration of each commutation event and is normally substantially constant when the magnitude of the DC current and the commutating inductance are substantially constant, and when the clamp capacitor voltage is substantially constant.

The process of commutating each switching module $10_1$, $10_2$, . . . , $10_n$ of the power electronic switching assembly 12 comprises a sequence of alternating first and second commutation events.

Figure 4A:
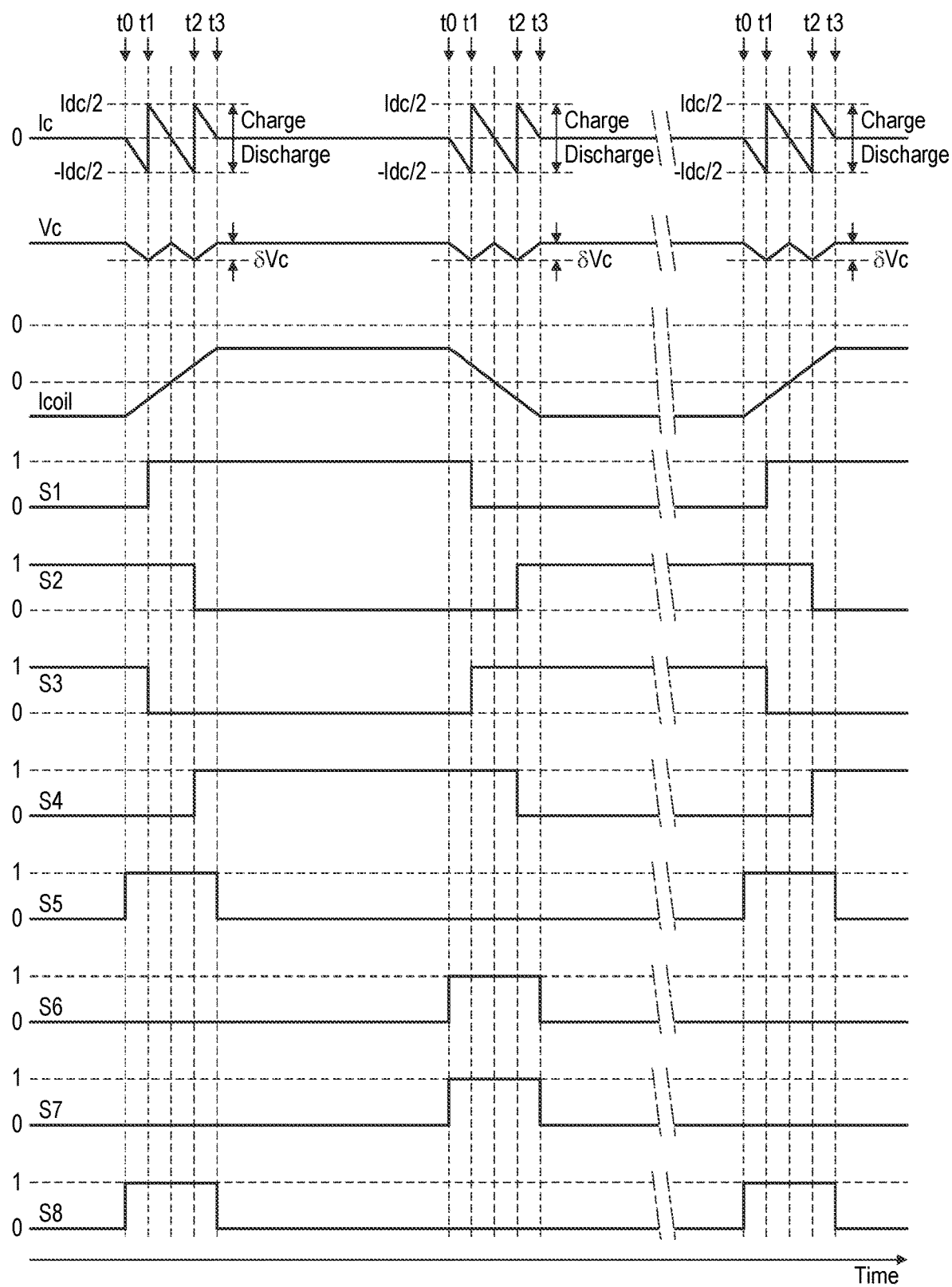
FIG. 4A is a schematic diagram showing current and voltage waveform and switching patterns of a commutation process according to the present invention.
Figure 4B:
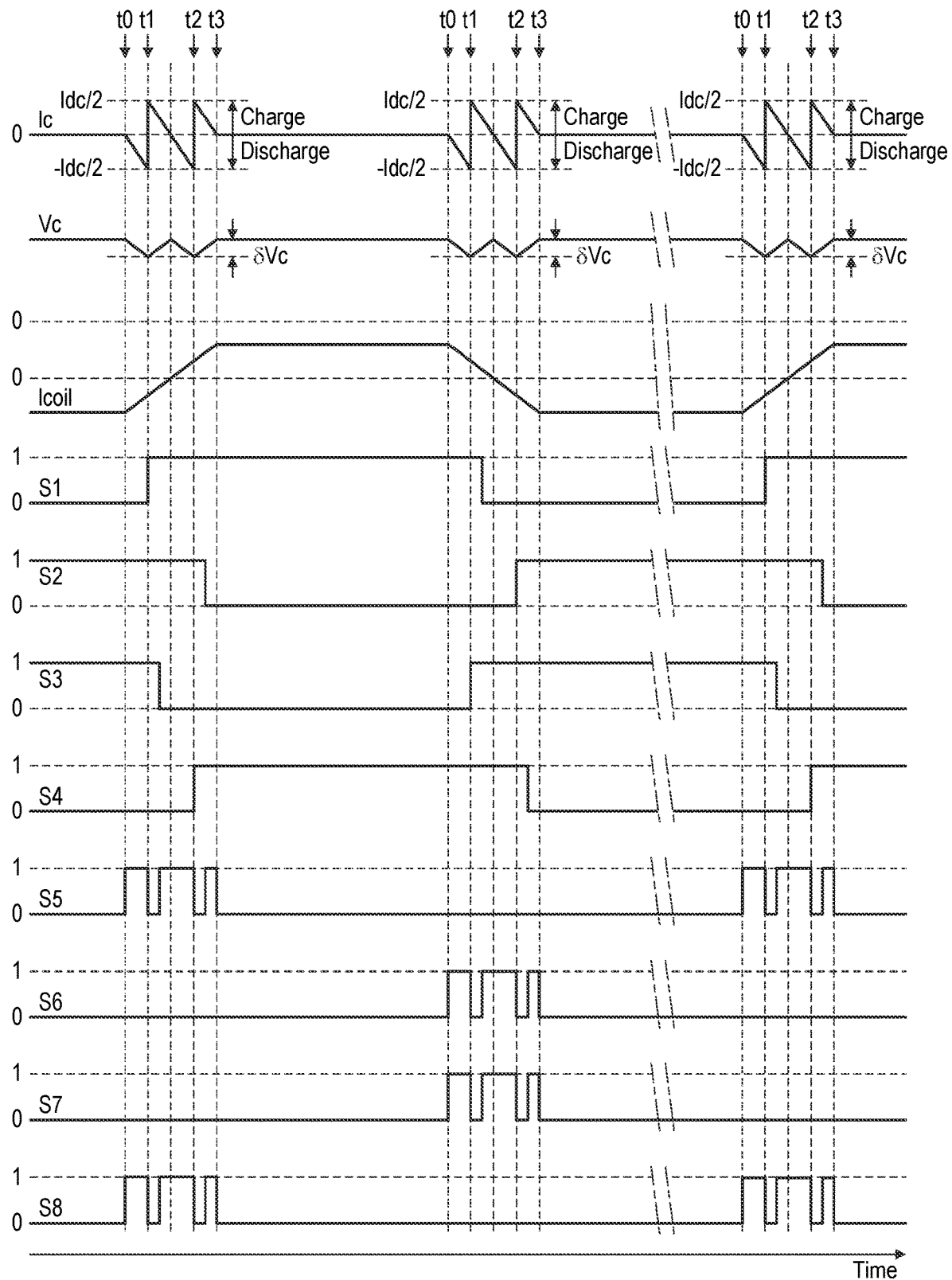
FIG. 4B is a schematic diagram showing switching patterns of a commutation process according to the present invention with dead time mitigation.

FIG. 4A shows the first and second commutation events for a particular switching module $10_p$ for a balanced clamp capacitor voltage case—i.e., where the clamp capacitor voltage reference signal (Vclamp_ref) is substantially constant and the clamp capacitor voltage does not need to be increased or decreased. In particular, FIG. 4A shows how the clamp capacitor current Ic, the clamp capacitor voltage Vc, and the coil current Icoil change during the first and second commutation events. FIG. 4A also shows when the various bridge and clamp switches S1, S2, . . . , S8 of the switching module $10_p$ are turned on and off during the first and second commutation events where a value of "1" in the switching patterns indicates that a particular switch is turned on and a value of "0" indicates that a particular switch is turned off. FIG. 4B shows when the various bridge and clamp switches S1, S2, . . . , S8 of the switching module $10_p$ are turned on and off during the first and second commutation events, but with optional dead time mitigation where three of the bridge switches are simultaneously in the on-state. For the switching pattern shown in FIG. 4A, the respective diagonal pair of clamp switches remain on for the duration of each commutation event so that the clamp capacitor C is continuously electrically connected to the AC terminals 20a, 20b of the H-bridge circuit 16 during each commutation event, whereas for the switching pattern shown in FIG. 4B, with optional dead time mitigation, the respective diagonal pair of clamp switches are momentarily switched off twice—e.g., for less than about 500 ns—during each commutation event.

FIGS. 4A and 4B are intentionally not to scale and waveforms have been scaled for clarity.

At the start time t0 of the first commutation event, the coil current Icoil is flowing through the second and third bridge switches S2, S3 (i.e., the first diagonal pair of bridge switches) of the switching module $10_p$ and through the stator coil $8_p$ in a first direction. The coil current Icoil corresponds to the DC current that is applied to the first and second DC bridge terminals 22a, 22b. The clamp capacitor current Ic is zero. The clamp capacitor voltage Vc is at an initial magnitude. Turning on the first diagonal pair of clamp switches S5, S8 at the start time t0 to electrically connect the clamp capacitor C of the switching module $10_p$ in parallel with the first and second AC bridge terminals 20a, 20b causes the clamp capacitor to start to discharge current into the stator coil $8_p$, thereby causing the coil current Icoil to start to decrease.

Between the start time t0 and the first intermediate time t1, the coil current Icoil continues to decrease. The clamp capacitor C is discharging and the clamp capacitor voltage Vc decreases.

At the first intermediate time t1, the first bridge switch S1 is turned on to provide a bypass path through the first and second bridge switches S1, S2 (i.e., through the first bridge leg) and immediately afterwards the third bridge switch S3 is turned off. One side of the stator coil $8_p$ therefore remains electrically connected to the first bridge leg while the other side of the stator coil is effectively in open circuit, thereby causing the clamp capacitor current Ic to reverse. The clamp capacitor current Ic goes from about −Idc/2 to about Idc/2, where Idc is the DC current. FIG. 4B shows how if momentary simultaneous conduction of the first, second and third bridge switches S1, S2 and S3 is unavoidable, dead time mitigation may be provided by momentarily turning off the first diagonal pair of clamp switches S5 and S8.

Between the first and second intermediate times t1 and t2, the clamp capacitor C remains electrically connected in parallel with the stator coil $8_p$ and the commutation of the coil current Icoil continues at substantially constant rate. After the reversal of the clamp capacitor current Ic at the first intermediate time t1, the clamp capacitor C starts to charge and the clamp capacitor voltage Vc starts to increase. The coil current Icoil passes through zero and causes the clamp capacitor current Ic to pass through zero at a point approximately midway between the first and second intermediate times t1 and t2. After passing through zero, the coil current Icoil starts to increase. The clamp capacitor current Ic reverses, and the clamp capacitor C starts to discharge. The clamp capacitor voltage Vc starts to decrease.

At the second intermediate time t2, the fourth bridge switch S4 is turned on and immediately afterwards the second bridge switch S2 is turned off. The bypass path through the first bridge leg is removed, which causes the clamp capacitor current Ic to reverse. The clamp capacitor current Ic goes from about −Idc/2 to about Idc/2. FIG. 4B shows how if momentary simultaneous conduction of the first, second and fourth bridge switches S1, S2 and S4 is unavoidable, dead time mitigation may be provided by momentarily turning off the first diagonal pair of clamp switches S5 and S8.

Between the second intermediate time t2 and the end time t3, the coil current Icoil continues to increase. The clamp capacitor C starts to charge and the clamp capacitor voltage Vc increases.

At the end time t3, when the first diagonal pair of clamp switches S5, S8 is turned off, the coil current Icoil is flowing through the first and fourth bridge switches S1, S4 (i.e., the second diagonal pair of bridge switches) and through the stator coil $8_p$ in a second direction, opposite to the first direction. The coil current Icoil corresponds to the DC current that is applied to the first and second DC bridge terminals 22a, 22b. The clamp capacitor current Ic is zero. The clamp capacitor voltage Vc is at a final magnitude, which is substantially the same as the initial magnitude.

The first and fourth bridge switches S1, S4 remain on until the start of the subsequent second commutation event.

At the start time t0 of the second commutation event, the coil current Icoil is flowing through the first and fourth bridge switches S1, S4 (i.e., the second diagonal pair of bridge switches) of the switching module $10_p$ and through the stator coil $8_p$ in the second direction. The coil current Icoil corresponds to the DC current that is applied to the first and second DC bridge terminals 22a, 22b but its polarity has been reversed. The clamp capacitor current Ic is zero. The clamp capacitor voltage Vc is at an initial magnitude. Turning on the second diagonal pair of clamp switches S6, S7 at the start time t0 to electrically connect the clamp capacitor C in parallel with the first and second AC bridge terminals 20a, 20b causes the clamp capacitor to start to discharge current into the stator coil 8, thereby causing the coil current Icoil to start to decrease.

Between the start time t0 and the first intermediate time t1, the coil current Icoil continues to decrease. The clamp capacitor C is discharging and the clamp capacitor voltage Vc decreases.

At the first intermediate time t1, the third bridge switch S3 is turned on to provide a bypass path through the third and fourth bridge switches S3, S4 (i.e., through the second bridge leg) and immediately afterwards the first bridge switch S1 is turned off. One side of the stator coil $8_p$ therefore remains electrically connected to the second bridge leg while the other side of the stator coil is effectively in open circuit, thereby causing the clamp capacitor current Ic to reverse. The clamp capacitor current Ic goes from about −Idc/2 to about Idc/2. FIG. 4B shows how if momentary simultaneous conduction of the first, third and fourth bridge switches S1, S3 and S4 is unavoidable, dead time mitigation may be provided by momentarily turning off the second diagonal pair of clamp switches S6 and S7.

Between the first and second intermediate times t1 and t2, the clamp capacitor C remains electrically connected in parallel with the stator coil $8_p$ and the commutation of the coil current Icoil continues at substantially constant rate. After the reversal of the clamp capacitor current Ic at the first intermediate time t1, the clamp capacitor C starts to charge and the clamp capacitor voltage Vc starts to increase. The coil current Icoil passes through zero and causes the clamp capacitor current Ic to pass through zero at a point approximately midway between the first and second intermediate times t1 and t2. After passing through zero, the coil current Icoil starts to increase. The clamp capacitor current Ic reverses, and the clamp capacitor C starts to discharge. The clamp capacitor voltage Vc starts to decrease.

At the second intermediate time t2, the second bridge switch S2 is turned on and immediately afterwards the fourth bridge switch S4 is turned off. The bypass path through the second bridge leg is removed, which causes the clamp capacitor current Ic to reverse. The clamp capacitor current Ic goes from about −Idc/2 to about Idc/2. FIG. 4B shows how if momentary simultaneous conduction of the second, third and fourth bridge switches S2, S3 and S4 is unavoidable, dead time mitigation may be provided by momentarily turning off the second diagonal pair of clamp switches S6 and S7.

Between the second intermediate time t2 and the end time t3, the coil current Icoil continues to increase. The clamp capacitor C starts to charge and the clamp capacitor voltage Vc increases.

At the end time t3, when the second diagonal pair of clamp switches S6, S7 is turned off, the coil current Icoil is flowing through the second and third bridge switches S2, S3 (i.e., the first diagonal pair of bridge switches) and through the stator coil $8_p$ in the first direction. The coil current Icoil corresponds to the DC current that is applied to the first and second DC bridge terminals 22a, 22b but its polarity has again been reversed. The clamp capacitor current Ic is zero. The clamp capacitor voltage Vc is at a final magnitude, which is substantially the same as the initial magnitude.

The second and third bridge switches S2, S3 remain on until the start of the subsequent first commutation event.

In practice, many successive polarity reversals of coil current are carried out during the course of the commutation process when the DC electrical machine is operating. The timing signals of each commutation event are set relative to the phase reference and the parameters of the DC electrical machine 1 that prevail immediately prior to each commutation event. A practical implementation may include a number of non-ideal or unpredictable factors that affect the final magnitude of the clamp capacitor voltage after each commutation event and the purpose of the closed loop controller 34 is to adjust the timing signals—and hence the time periods between the start time t0 and the first and second intermediate times t1, t2—in order to achieve closed loop control of clamp capacitor voltage.

As explained above, in FIG. 4A the first and second commutation events are for a balanced clamp capacitor voltage case. But as a result of the closed loop voltage control, the clamp capacitor voltage will be increased or decreased dynamically during the commutation process in response to changes in the desired clamp capacitor voltage as set by the clamp voltage reference signal (Vclamp_ref) that is output by the primary controller 14. This is achieved by setting the timing signals so that the charges that are sequentially introduced and removed from the clamp capacitor are unbalanced over the particular commutation event. This means that the final magnitude of the clamp capacitor voltage at the end of the commutation event is lower or higher than the initial magnitude, thereby decreasing or increasing the clamp capacitor voltage over the course of the normal operation of the DC electrical machine 1.

The closed loop control of clamp capacitor voltage is described with reference to FIGS. 5 and 6.

Figure 5:
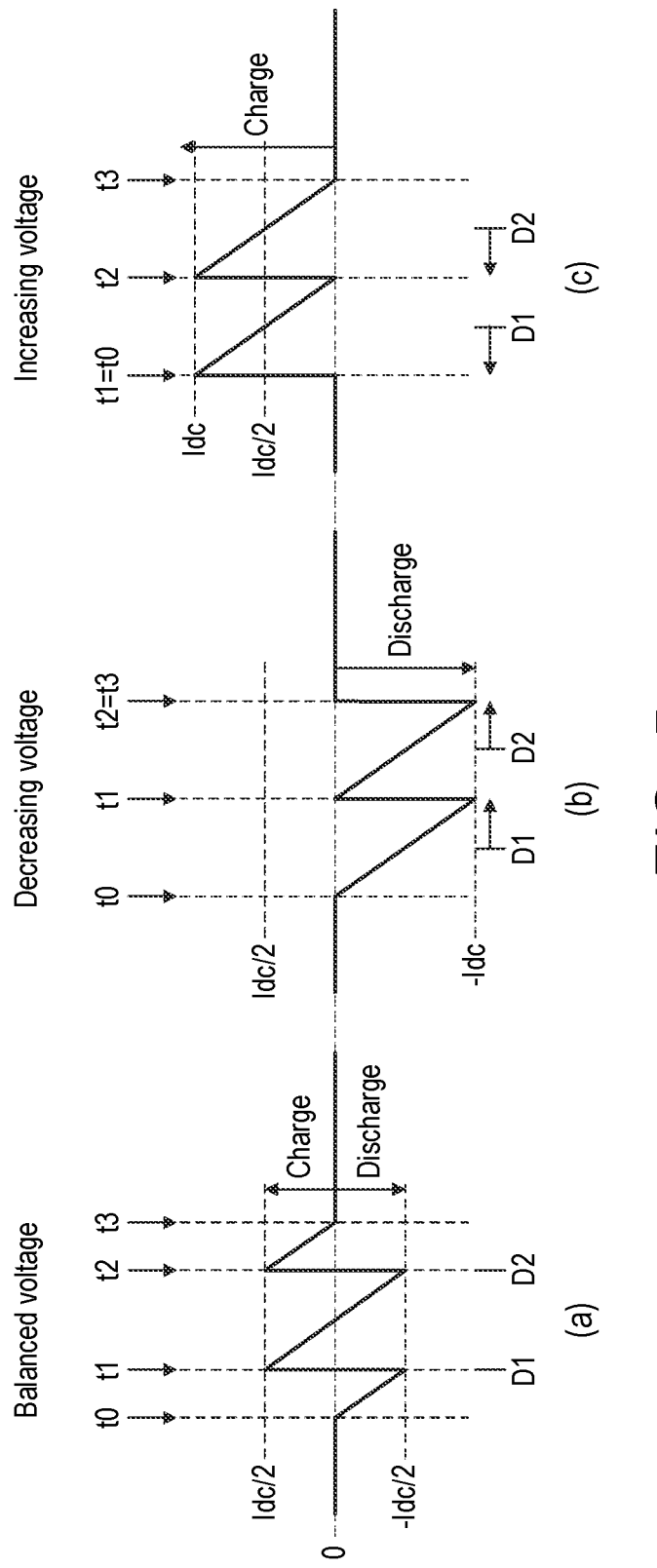
FIGS. 5 and 6 are schematic diagrams showing how the time periods are adjusted during the commutation process according to the present invention for closed loop control of the clamp capacitor voltage.
Figure 6:
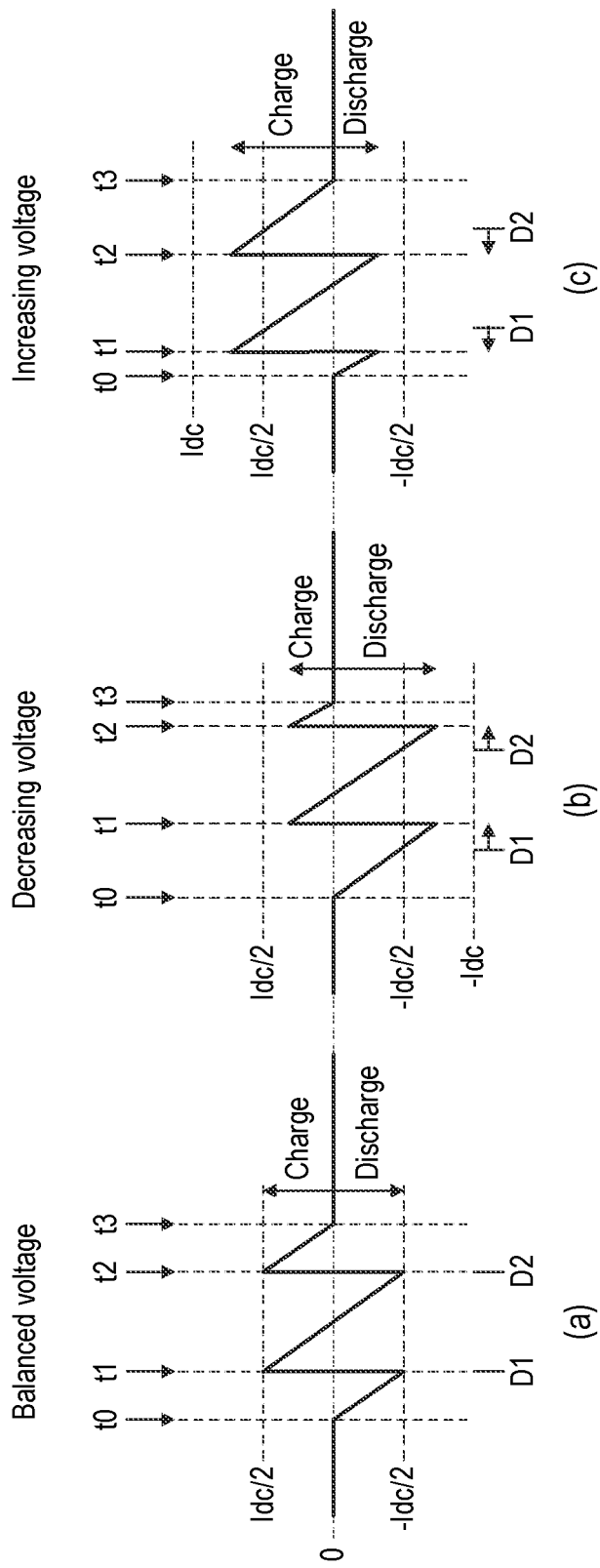

FIGS. 5 and 6 show a commutation event for: (a) a balanced clamp capacitor voltage case which corresponds to FIG. 4A, (b) a decreasing clamp capacitor voltage case—i.e., where the timing signals are set to decrease the clamp capacitor voltage in response to a decreasing clamp voltage reference signal, and (c) an increasing clamp capacitor voltage case—i.e., where timing signals are set to increase the clamp capacitor voltage in response to an increasing clamp voltage reference signal. The cases all assume that the total duration of the commutation event (i.e., the time period between the start time t0 and the end time t3) is unchanged.

In each case, a pair of time datums D1, D2 have been added underneath the current waveforms. The first time datum D1 corresponds to the first intermediate time t1 for the balanced voltage case (i.e., case (a)) and the second time datum D2 corresponds to the second intermediate time t2 for the balanced voltage case. In this balanced voltage case, the charges that are sequentially introduced and removed from the clamp capacitor C (i.e., during the charging and discharging) are balanced over the commutation event and so the final magnitude of the clamp capacitor voltage Vc is substantially the same as the initial magnitude—see FIG. 4A. Clamp capacitor current Ic varies between −Idc/2 and Idc/2.

For the decreasing clamp capacitor voltage case (i.e., case (b)), the first and second intermediate times t1 and t2 are offset to the right relative to the first and second time datums D1 and D2—i.e., the respective time periods between the start time t0 and the first and second intermediate times t1 and t2 are increased (or lengthened) by the secondary controller 32. FIG. 5 shows the limit case where the second intermediate time t2 is simultaneous with the end time t3. In this limit case, the clamp capacitor C is only discharged and so the final magnitude of the clamp capacitor voltage is lower than the initial magnitude. Clamp capacitor current Ic varies between −Idc and zero. FIG. 6 shows a more practical case where the second intermediate time t2 is before the end time t3. The clamp capacitor C is discharged more than it is charged and so the final magnitude of the clamp capacitor voltage is lower than the initial magnitude. Clamp capacitor current Ic varies between intermediate values between −Idc/2 and −Ide and between zero and Idc/2 depending on the offset.

For the increasing clamp capacitor voltage case (i.e., case (c)), the first and second intermediate times t1 and t2 are offset to the left relative to the first and second time datums D1 and D2—i.e., the respective time periods between the start time t0 and the first and second intermediate times t1 and t2 are decreased (or shortened) by the secondary controller 32. FIG. 5 shows the limit case where the first intermediate time t1 is simultaneous with the start time t0. In this limit case, the clamp capacitor C is only charged and so the final magnitude of the clamp capacitor voltage is higher than the initial magnitude. Clamp capacitor current Ic varies between zero and Idc. FIG. 6 shows a more practical case where the first intermediate time t1 is after the start time t0. The clamp capacitor C is charged more than it is discharged and so the final magnitude of the clamp capacitor voltage is higher than the initial magnitude. Clamp capacitor current Ic varies between intermediate values between −Idc/2 and zero and between Idc/2 and Idc depending on the offset.

The time period between the start time t0 and the end time t3 may also be varied or adjusted. For example, if the magnitude of the DC current increases and/or if the commutating inductance increases, the time period between the start time t0 and the end time t3 will increase and vice versa. The time periods between the start time t0 and the first and second intermediate times t1 and t2 would be adjusted accordingly. It will be seen from FIGS. 5 and 6 that the relative positions of the first and second time datums D1, D2 are fixed at approximately ¼ and ¾ of the time period between the start time t0 and the end time t3. It will be readily understood that it is not essential that time adjustments to the timing signals are made relative to such fixed time datums. Put another way, the time datums are helpful to understand how the timing signals are varied or adjusted to provide the closed loop control of the capacitor voltage, but they might not be used in a practical controller.

The time period between successive start times—i.e., the time period between the start time of a first commutation event and the start time of the successive second commutation event or vice versa—may be varied or adjusted. The position of the start time t0 of each commutation event may be varied or adjusted relative to rotor position in response to changes in the time period between the start time t0 and the end time t3. Typically, the start time t0 will be adjusted to maintain an offset between a point approximately midway between the start and end times t0, t3 and rotor position when the load angle of the DC electrical machine 1 is to be held substantially constant. The primary controller 14 may adjust the load angle of the DC electrical machine 1 by adjusting the position of the start time t0 relative to rotor position. Load angle may be adjusted to optimise the achievable shaft torque per unit DC current source magnitude and/or to affect the excitation of the DC electrical machine 1, for example.

The effect of load angle (or power factor) and practical coil voltage waveforms upon commutation rate is now described with reference to FIGS. 7 and 8, which show commutation waveforms at two exemplary load angles, both at the same DC current source magnitude, and under the conditions that exist during first commutation events, i.e., when clamp switches S5 and S8 initiate the commutation. Substantially equivalent waveforms exist for the coil voltage, EMF and coil current during the second commutation events, i.e., when clamp switches S6 and S7 initiate the commutation, but all polarities are effectively reversed. The set of waveforms shown in FIG. 7 is for unity power factor, i.e., where the zero crossing of coil current occurs at the same time as the zero crossing of coil voltage. The set of waveforms shown in FIG. 8 is for a nominal lagging power factor, i.e., where the zero crossing of coil current occurs after the zero crossing of coil voltage. Both sets of waveforms show "ideal" and "practical" coil current commutations. In this context the term "ideal" means that the di/dt of the coil current Icoil is constant between the start and end times t0 and t3, as would occur if the "forcing voltage" that defines the di/dt in the commutating inductance was also ideally constant, whereas the term "practical" means that the di/dt of the coil current Icoil is variable between the start and end times t0 and t3 because the "forcing voltage" that defines the di/dt in the commutating inductance is variable in practice. Moreover, the term "forcing voltage" means the difference between clamp capacitor voltage and coil open circuit voltage at any point in time between the start and end times t0 and t3. The forcing voltage is defined by Vc-EMF. The term "power factor" is used in the conventional sense as applied to the fundamental frequency of both current and voltage waveforms, but the skilled person will recognise that the waveforms shown are both non-sinusoidal and will also recognise that the zero crossings of these non-sinusoidal waveforms are coincident with the zero crossings of the fundamental frequency components.

Figure 9:
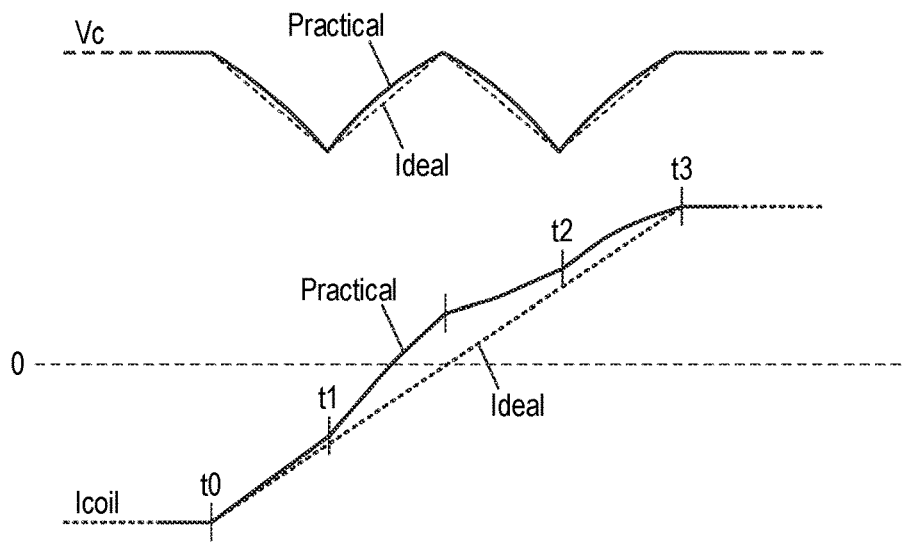
FIG. 9 is a schematic diagram showing practical and ideal current and voltage waveforms.

The set of waveforms in FIG. 7 show the significance of forcing voltage variability between the start and end times t0 and t3. Forcing voltage at the start time t0 is shown to be greater than the forcing voltage at the end time t3 because the EMF at the start time t0 is different to the EMF at the end time t3—more particularly, the EMF at the start time t0 is equal and opposite to the EMF at the end time t3 under conditions of unity power factor. Whereas the EMF is shown as having a substantially constant dv/dt between the start and end times t0 and t3, the clamp capacitor voltage Vc experiences an approximately triangular perturbation having minima at the first and second intermediate times t1 and t2, and a maxima at a point midway between the first and second intermediate times t1 and t2. The forcing voltage therefore experiences the summation of the ramped EMF variation and the triangular variation in the clamp capacitor voltage Vc. The rate of change of coil current also has variability. The practical coil current waveform is consistently above the ideal coil current waveform between the start and end times t0 and t3, and also experiences discontinuities at the first and second intermediate times t1, t2, and at a point midway between the first and second intermediate times t1 and t2. The departure of practical waveforms from ideal waveforms is shown more clearly in FIG. 9.

The set of waveforms in FIG. 8 show a similar forcing voltage variability between the start and end times t0 and t3. The forcing voltage at the start time t0 is shown to be greater than the forcing voltage at the end time t3 because the EMF at the start time t0 is different to the EMF at the end time t3. But more particularly, both forcing voltages are reduced relative to the case of unity power factor, hence the effect of the approximately triangular perturbation of the clamp capacitor voltage Vc is disproportionately increased. The forcing voltage again experiences the summation of the ramped EMF variation and the triangular variation of the clamp capacitor voltage Vc and the rate of change of coil current has variability. The practical coil current waveform is consistently above the ideal coil current waveform between the start and end times t0 and t3, and also experiences discontinuities at the first and second intermediate times t1 and t2, and at a point midway between the first and second intermediate times t1 and t2.

The excursions of the clamp capacitor voltage Vc are shown on a similar scale to the excursions in EMF and it is evident that the excursions of clamp capacitor voltage are much smaller than those of the EMF. At the scale used it is not possible to show the difference between ideal and practical waveforms of the clamp capacitor voltage. The departure of practical waveforms from ideal waveforms for unity power factor is shown more clearly in FIG. 9.

In a complete DC electrical machine system there would be non-ideal perturbations in the magnitude of current in the DC current source 24, with corresponding perturbations in the coil current that is present immediately before the start time t0. There would also be non-ideal perturbations in the EMF before and during commutation events. In such a complete DC electrical machine system it is the case that each successive commutation event may occur under slightly different conditions, some of which may be predicted by design or measurement whilst other may be unpredictable, and the consequence of imperfect adaptation of the firing sequence is that the magnitude of the clamp capacitor voltage at the end time t3 may differ from that at the start time t0 even during the balanced voltage case. Moreover, the clamp capacitor voltage reference signal (Vclamp_ref) may be varied between successive commutation events in order to exert control over the rate of change of coil current during the commutation process and to influence harmonic content in coil current, for example. The purpose of the secondary controller 32 is therefore to set or adapt the timing signals to achieve the desired closed loop control of the clamp capacitor voltage based on the clamp capacitor voltage reference and feedback signals (Vclamp_ref and Vclamp_fb). By increasing the clamp capacitor voltage, it is possible to increase the rate of change of coil current during commutations and vice versa. The maximum viable magnitude of clamp capacitor voltage is defined by the voltage ratings of the bridge switches S1, S2, . . . , S4 and the clamp switches S5, S6, . . . , S8. The minimum viable magnitude of clamp capacitor voltage is defined by the peak magnitude of the EMF during preceding commutation events because any attempt to reduce the clamp capacitor voltage below that level would cause the free-wheeling diodes of the active clamp to conduct. One function of the control provided by the primary controller 14 is to define the clamp capacitor voltage reference signal in order to respect these limits in the clamp capacitor voltage.

Figure 10:
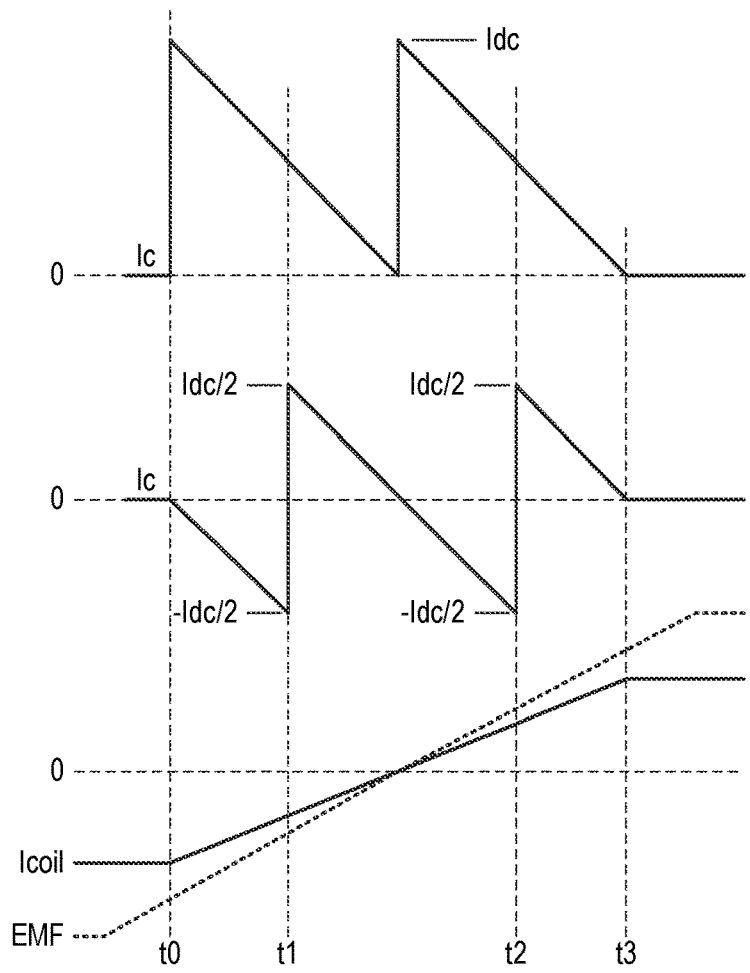
FIG. 10 is a schematic diagram showing current and voltage waveforms directly comparing a commutation event of the present invention with a prior art commutation event.

A main objective of the present invention is to allow the size of the clamp capacitor C to be minimised whilst at the same time allowing the energy that is removed from the commutating inductance of the stator coil $8_p$ during the commutation process to be returned to the stator coil in order to produce useful torque. The minimisation of the clamp capacitor C is described with reference to FIG. 10 for unity power factor operation. In FIG. 10 the upper waveform shows the clamp capacitor current Ic according to EP 2704297 and the middle waveform shows the clamp capacitor current Ic according to the present invention for the balanced voltage case. The lower waveform shows the coil current Icoil and the EMF.

The coil current Ic and coil open circuit voltage (EMF) are shown to have zero crossings that are in phase, i.e., representing unity power factor operation. It can be seen that the total duration of the commutation event from the start time t0 to the end time t3 is the same for both the prior art and the commutation process according to the present invention. The commutation event according to the present invention has four pulses of clamp capacitor current, each having a peak amplitude Idc/2, whereas the commutation event according to the prior art has two pulses of peak amplitude Idc. The base width of the current pulses in the commutation event according to the present invention are one half of the base widths of the prior art commutation event. In the commutation process of the present invention the time integral of clamp capacitor current, per pulse, is one quarter of that in the prior art. The rms current in the commutation process of the present invention is one quarter of that in the prior art. When the same value of clamp capacitance is employed in the two cases, the clamp voltage excursion per current pulse in the present invention, i.e., δVc, is ¼ of that in the prior art. In practice, the commutation process of the present invention, in having one quarter of the time integral of current and ¼ of the voltage excursion, per pulse, may have a capacitor size of approximately ⅛ of that in the prior art.

At the end time t3 the active clamp 4 has returned the energy associated with commutation of current in the commutating inductance of the stator coil $8_p$ back into the stator coil whereas the prior art DC electrical machine described in EP 2704297 requires a separate energy recovery means to return commutation energy to the armature circuit by discharging the clamp capacitor to the required voltage. The active clamp 18 described herein provides voltage clamping, energy recovery and clamp voltage control functions in a single circuit whose clamp switches S5, S6, . . . , S8 are not significantly larger than the clamp diodes of the prior art, hence the clamping and energy recovery components of the switching module of the present invention are much smaller than those in the prior art.

The invention claimed is:

1. A process of commutating a switching module of a power electronic switching assembly comprising a sequence of alternating first and second commutation events, wherein the switching module comprises:
   an H-bridge circuit comprising:
      first and second AC bridge terminals electrically connectable to a respective coil, e.g., a stator coil of a direct current DC electrical machine (1),
      first and second DC bridge terminals electrically connectable to a DC current source, a first switch electrically connected between the first AC bridge terminal (20a) and the first DC bridge terminal, a second switch electrically connected between the first AC bridge terminal and the second DC bridge terminal, a third switch electrically connected between the second AC bridge terminal and the first DC bridge terminal, and a fourth switch electrically connected between the second AC bridge terminal and the second DC bridge terminal; and an active clamp comprising:

a first AC clamp terminal electrically connected to the first AC bridge terminal, a second AC clamp terminal electrically connected to the second AC bridge terminal, first and second DC clamp terminals, a fifth switch electrically connected between the first AC clamp terminal and the first DC clamp terminal, a sixth switch electrically connected between the first AC clamp terminal and the second DC clamp terminal, a seventh switch electrically connected between the second AC clamp terminal and the first DC clamp terminal, an eighth switch electrically connected between the second AC clamp terminal and the second DC clamp terminal, and an energy storage device electrically connected between the first and second DC terminals, wherein immediately before the start of each first commutation event, the second and third switches are on and all other switches are off, and immediately before the start of each second commutation event, the first and fourth switches are on and all other switches are off;

wherein for each first commutation event:

at a start time that defines the start of the respective first commutation event, the fifth and eighth switches are turned on to electrically connect the energy storage device in parallel with the first and second AC bridge terminals, and remain on or substantially on until turned off at an end time that defines the end of the respective first commutation event, at a first intermediate time at or after the start time and before the end time, the first switch is turned on to provide a bypass path through the first and second switches and immediately afterwards the third switch is turned off, and at a second intermediate time after the start time and at or before the end time, and after the first intermediate time, the fourth switch is turned on and immediately afterwards the second switch is turned off;

wherein for each second commutation event:

at a start time that defines the start of the respective second commutation event, the sixth and seventh switches are turned on to electrically connect the energy storage device in parallel with the first and second AC bridge terminals, and remain on or substantially on until turned off at an end time that defines the end of the respective second commutation event, at a first intermediate time at or after the start time and before the end time, the third switch is turned on to provide a bypass path through the third and fourth switches and immediately afterwards the first switch is turned off, and at a second intermediate time after the start time and at or before the end time, and after the first intermediate time, the second switch is turned on an immediately afterwards the fourth switch is turned off;

wherein for each first and second commutation event, the time period between the start time and the first intermediate time, and the time period between the start time and the second intermediate time, are varied according to closed loop control of the voltage across the energy storage device.

2. A process according to claim 1, wherein the closed loop control uses a voltage reference indicative of a desired voltage across the energy storage device, and a voltage feedback.

3. A process according to claim 2, wherein the voltage reference is varied during the commutation process.

4. A process according to claim 1, wherein the first intermediate time, the second intermediate time, and the end time of each first and second commutation event are determined by a controller using a voltage reference indicative of a desired voltage across the energy storage device, and a voltage feedback.

5. A process according to claim 4, wherein the controller also uses one or more of a DC current feedback, a coil current feedback, and a coil voltage signal feedback to determine the first intermediate time, the second intermediate time, and the end time of each first and second commutation event.

6. A process according to claim 4, wherein the start time of each first and second commutation event is determined by the controller based on a phase reference.

7. A process according to claim 4, wherein the controller comprises a sub-controller, wherein the difference between the voltage reference and the voltage feedback is provided to the sub-controller that applies a correction based on one or more of proportional, integral and derivative terms, and wherein the output of the sub-controller is used to determine the first intermediate time, the second intermediate time, and the end time of each first and second commutation event.

8. A process according to claim 4, wherein the voltage reference is varied during the commutation process.

9. A switching module comprising:

an H-bridge circuit comprising:

first and second AC bridge terminals electrically connectable to a respective coil of a DC electrical machine, first and second DC bridge terminals electrically connectable to a DC current source, a first switch electrically connected between the first AC bridge terminal and the first DC bridge terminal, a second switch electrically connected between the first AC bridge terminal and the second DC bridge terminal, a third switch electrically connected between the second AC bridge terminal and the first DC bridge terminal, and a fourth switch electrically connected between the second AC bridge terminal and the second DC bridge terminal; and an active clamp comprising:

a first AC clamp terminal electrically connected to the first AC bridge terminal, a second AC clamp terminal electrically connected to the second AC bridge terminal, first and second DC clamp terminals,
a fifth switch electrically connected between the first AC clamp terminal and the first DC clamp terminal,
a sixth switch electrically connected between the first AC clamp terminal and the second DC clamp terminal,
a seventh switch electrically connected between the second AC clamp terminal and the first DC clamp terminal,
an eighth switch electrically connected between the second AC clamp terminal and the second DC clamp terminal, and
an energy storage device electrically connected between the first and second DC terminals; and
a controller adapted to commutate the switching module according to a commutation process comprising a sequence of alternating first and second commutation events;
wherein for each first commutation event the controller is adapted to:
 turn on the fifth and eighth switches at a start time that defines the start of the respective first commutation event, to electrically connect the energy storage device in parallel with the first and second AC bridge terminals, and to turn off the fifth and eight switches at an end time that defines the end of the respective first commutation event,
 turn on the first switch at a first intermediate time at or after the start time and before the end time to provide a bypass path through the first and second switches and immediately afterwards to turn off the third switch, and
 turn on the fourth switch at a second intermediate time after the start time and at or before the end time, and after the first intermediate time, and immediately afterwards to turn off the second switch,
wherein for each second commutation event the controller is adapted to:
 turn on the sixth and seventh switches at a start time that defines the start of the respective second commutation event, to electrically connect the energy storage device in parallel with the first and second AC bridge terminals, and to turn off the sixth and seventh switches at an end time that defines the end of the respective second commutation event,
 turn on the third switch at a first intermediate time at or after the start time and before the end time, to provide a bypass path through the third and fourth switches and immediately afterwards to turn off the first switch, and
 turn on the second switch at a second intermediate time after the start time and at or before the end time, and after the first intermediate time, and immediately afterwards to turn off the fourth switch;
wherein for each first and second commutation event, the controller is further adapted to vary the time period between the start time and the first intermediate time, and the time period between the start time and the second intermediate time, according to closed loop control of the voltage across the energy storage device.

10. A switching module according to claim 9, wherein the controller includes a closed loop controller and a gate drive controller that is adapted to generate gate drive signals.

11. A switching module according to claim 9, wherein the energy storage device is a capacitor.

12. A switching module according to claim 9, wherein the controller is further adapted to determine the first intermediate time, the second intermediate time, and the end time of each first and second commutation event using a voltage reference indicative of a desired voltage across the energy storage device, and a voltage feedback.

13. A switching module according to claim 12, wherein the controller is further adapted to determine the first intermediate time, the second intermediate time, and the end time of each first and second commutation event using one or more of a DC current feedback, a coil current feedback and a coil voltage signal feedback.

14. A switching module according to claim 12, wherein the controller is further adapted to determine the start time of each first and second commutation event based on a phase reference.

15. A direct current DC electrical machine comprising:
a stator with a plurality of stator coils;
a rotor;
a DC current source; and
a power electronic switching assembly comprising a plurality of switching modules according to claim 9, wherein the first and second AC bridge terminals of each switching module are electrically connected to a respective stator coil and the first and second DC bridge terminals of each switching module are electrically connected to the DC current source.

* * * * *